(12) United States Patent
Reiter et al.

(10) Patent No.: US 7,093,846 B2
(45) Date of Patent: Aug. 22, 2006

(54) AIRBAG SYSTEM DESIGNED FOR TWO PERSONS

(75) Inventors: Thomas Reiter, Dachau (DE); Karl-Heinz Sommer, Stockdorf (DE); Jörg Albert, Germering (DE)

(73) Assignee: Autoliv Development AB, Vargarda (SE)

( * ) Notice: Subject to any disclaimer, the term of this patent is extended or adjusted under 35 U.S.C. 154(b) by 247 days.

(21) Appl. No.: 10/630,163

(22) Filed: Jul. 30, 2003

(65) Prior Publication Data

US 2004/0046370 A1    Mar. 11, 2004

(30) Foreign Application Priority Data

Aug. 1, 2002    (DE) ................. 102 35 128

(51) Int. Cl.
*B60R 21/16*    (2006.01)
(52) U.S. Cl. ................................ 280/728.2
(58) Field of Classification Search ............... 280/729, 280/730.1, 730.2, 743.1, 728.1
See application file for complete search history.

(56) References Cited

U.S. PATENT DOCUMENTS

| | | | |
|---|---|---|---|
| 3,747,952 A | | 7/1973 | Graebe |
| 5,273,309 A | * | 12/1993 | Lau et al. ................ 280/730.2 |
| 5,312,131 A | * | 5/1994 | Kitagawa et al. ........ 280/730.2 |
| 5,492,367 A | * | 2/1996 | Albright et al. .......... 280/743.1 |
| 5,556,128 A | * | 9/1996 | Sinnhuber et al. ....... 280/730.2 |
| 5,775,729 A | * | 7/1998 | Schneider et al. ....... 280/730.1 |
| 5,797,620 A | * | 8/1998 | Eyrainer ................. 280/730.1 |
| 5,895,069 A | * | 4/1999 | Heilig et al. ............. 280/730.1 |
| 6,142,521 A | * | 11/2000 | Shephard .................... 280/748 |
| 6,336,653 B1 | * | 1/2002 | Yaniv et al. .............. 280/730.1 |
| 2001/0038199 A1 | * | 11/2001 | Fischer ................... 280/730.2 |
| 2002/0180193 A1 | | 12/2002 | Smith |

FOREIGN PATENT DOCUMENTS

| | | |
|---|---|---|
| DE | 4302891 | 2/1992 |
| DE | 19620537 A1 | 12/1996 |
| DE | 19712511 A1 * | 10/1998 |
| DE | 19933586 C1 | 1/2001 |
| WO | WO-97/44215 | 11/1997 |

* cited by examiner

*Primary Examiner*—Faye M. Fleming
(74) *Attorney, Agent, or Firm*—Madson & Austin (57) ABSTRACT

An airbag system for jointly supporting at least two vehicle occupants inside a motor vehicle in case of an accident with at least two separate airbags inflatable with a gas supplied by a gas generator. The airbag system has at least two airbags (14, 15) folded into a common housing (10) to be arranged in the dashboard of the motor vehicle. The airbags are connected to a common gas generator (11) having at least two outflow areas (13, 18, 19) assigned to the at least two airbags (14, 15). Each airbag (14, 15) is sealed by a deflector (16, 17) inserted therein against the respectively other airbag (14, 15), and the airbags are fixed inside the housing (10).

19 Claims, 7 Drawing Sheets

AIRBAG SYSTEM DESIGNED FOR TWO PERSONS

BACKGROUND OF THE INVENTION

The invention relates to an airbag system for jointly supporting at least two vehicle occupants inside a motor vehicle in case of an accident. The airbag system has at least two separate airbags inflatable by gas supplied by a gas generator.

German Patent Specification DE 43 02 891 C2 discloses an airbag system which is designed to support at least two vehicle occupants, especially in the knee region. To this end, the prior-art airbag system has two separate airbags arranged in the center console of a motor vehicle. When triggered, these airbags are inflated by a common inflation device and emerge laterally from the center console so that they extend in front of the knees of the vehicle occupants sitting to the right and the left of the center console supporting them in the knee region.

The airbag system disclosed in DE 43 02 891 C2 cannot be used to support the upper body of several, or at least two, vehicle occupants by means of airbags inflatable from the dashboard. To solve this problem it is known from Patent Specification DE 199 33 586 C1 or German Laid Open Publication DE 196 20 537 A1 to divide a single airbag into several chambers. The airbag extends in front of the two or more vehicle occupants and consists of a uniform textile blank, using suitable configurations.

An airbag system designed in this manner has several drawbacks. Such a system can be optimally configured only for two persons of identical size penetrating the central airbag uniformly. If only one person is to be protected, one problem is that the internal pressure of the large airbag required to produce a corresponding retaining action cannot be reached because the volume of the airbag is too large. In the case of two persons of very different size and different body weight, the vehicle occupants also cannot be optimally protected because the differences in body size and body weight cannot be taken into account. Also, if the vehicle occupants are sitting in different positions relative to the airbag prior to the accident, very different retaining actions result, even for identical occupants. Furthermore, such a single airbag has a very large volume. Since the time required for inflation must be comparable to that of other airbag systems, such a large airbag must be filled with a substantially greater volume flow per time unit. Very high loads can occur especially for vehicle occupants sitting near the area in front of the deploying airbag, i.e. in a so-called out/off position.

Thus, an object of the invention is to provide an airbag system which offers both or several vehicle occupants equal protection for the loading cases that have to be assumed.

This object, including advantageous embodiments and refinements of the invention, is attained as set forth in the claims following this description.

BRIEF SUMMARY OF THE INVENTION

The invention is drawn to an airbag system with at least two separate airbags inflatable by the gas supplied by a gas generator for jointly supporting at least two vehicle occupants inside a motor vehicle in case of an accident. The invention provides that the airbags are folded into a common housing to be arranged in the dashboard of the motor vehicle and connected to a common gas generator with outflow areas assigned to the at least two airbags. Each airbag is sealed against the other airbag by a deflector inserted therein and is fixed within the common housing.

The configuration according to the invention has the advantage that the two airbags are filled by a central gas generator with gas streams adapted to the proportional volume of each airbag. Gas cannot flow between the airbags because associated deflector units individually seal the airbags. However, the two airbags are nevertheless arranged in a common housing, which can be installed as a unit in the dashboard of a motor vehicle. Thus, the airbag system according to the invention is distinguished by simple handling and easy installation.

In its basic design, the invention provides for two airbags to be connected to a gas generator, but additional airbags may be incorporated in the invention. If additional airbags are provided, the common housing must be made correspondingly larger, and the gas generator must have correspondingly more outflow areas.

According to one embodiment, the invention is further characterized in that the airbags are deployed from the common housing in the same direction.

Another embodiment of the invention provides that the gas generator is designed to have a symmetrical outflow capacity in the provided outflow areas, so that the two airbags are inflated symmetrically. Alternatively, the outflow capacity of the different outflow areas may differ, so that different size ratios of the vehicle occupants or different seating positions can be taken into account by controlling the inflation behavior of the gas generator as a function of the accident conditions.

If a biaxial type of construction of the gas generator is used, yet another embodiment of the invention provides that the biaxial gas generator has a central combustion system with adjusted gas distribution to its outflow areas. Alternatively, it may also be provided that separate combustion systems respectively are assigned to the outflow areas of a biaxial gas generator.

It may furthermore be provided that two gas generators may be arranged in the common housing which operate as a two-stage system to generate the gas, and each airbag is connected to the associated outflow areas of the two gas generators.

To simplify installation, it may be provided that the deflectors disposed in the airbags can be mutually connected and installed as a unit in the common housing together with the connected airbags.

Other embodiments of the invention provide that the airbags are each folded into the common housing with an identical or with a different folding configuration.

It may furthermore be provided that the airbags are each made of an identical material or a different material.

BRIEF DESCRIPTION OF THE DRAWINGS

The invention will now be described by way of example with reference to embodiments depicted in the drawing in which.

DETAILED DESCRIPTION OF THE INVENTION

Figure 1:
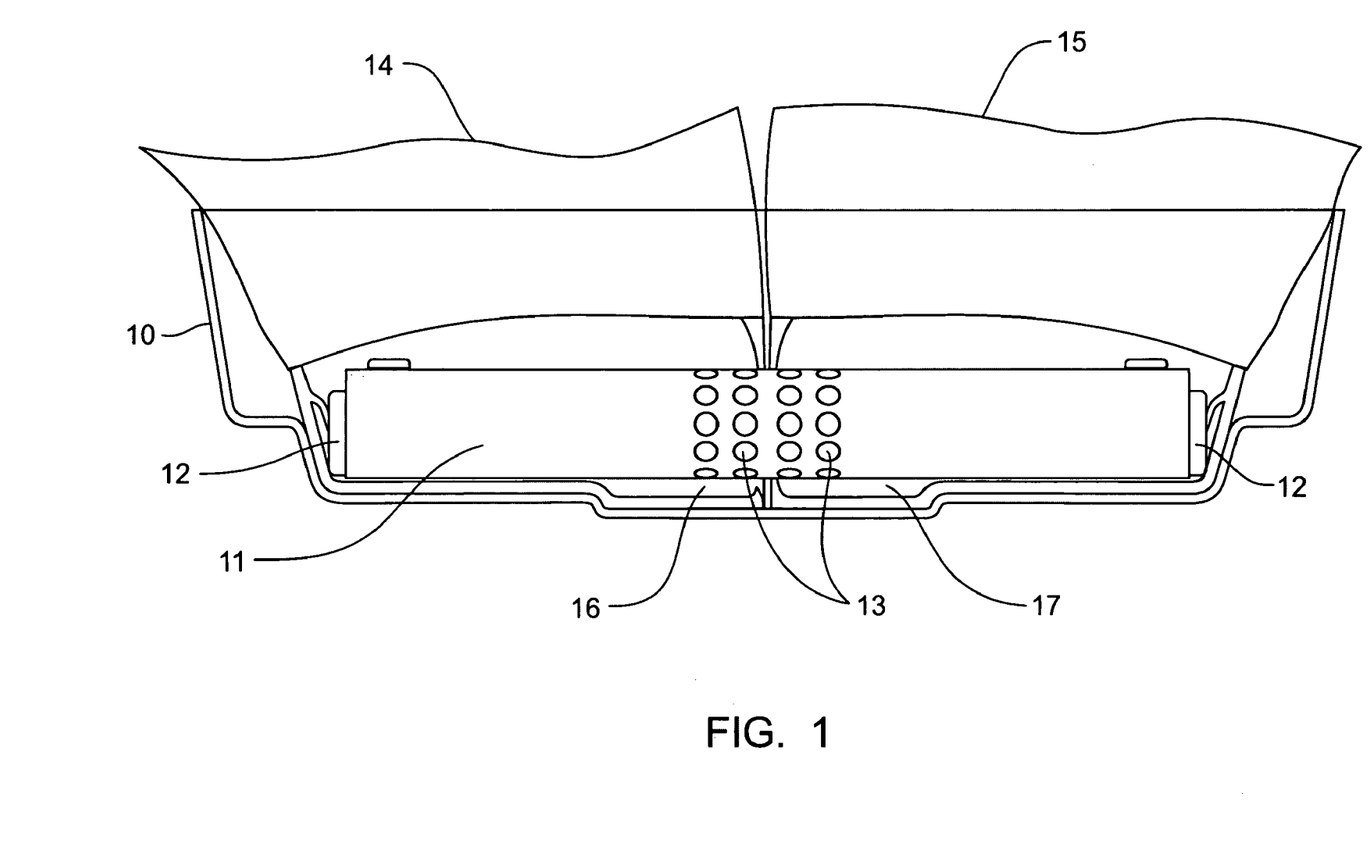
FIG. 1 is a schematic side view of an airbag system with a housing and two airbags connected to a gas generator.

As shown in FIG. 1, a central gas generator 11 is mounted in a common housing 10 of an airbag system. An ignition connector 12 is connected to each of the two outer ends of the gas generator 11. A central outflow area 13 is formed in the center of the gas generator 11. Two airbags 14 and 15, separated from one another, are connected to the gas generator 11 by means of deflectors 16 and 17. Deflectors 16 and 17 are inserted into the airbags and produce the connection with the gas generator 11 such that each of the two airbags 14 and 15 covers approximately half the outflow area 13. As a result, when the gas generator 11 is fired, the two airbags 14, 15 are substantially equally inflated through the outflow area 13. The two deflectors 16 and 17 separately seal the two airbags 14 and 15 against the gas generator 11 and against each other so that substantially no gas flows between the two airbags 14 and 15.

Figure 2A:
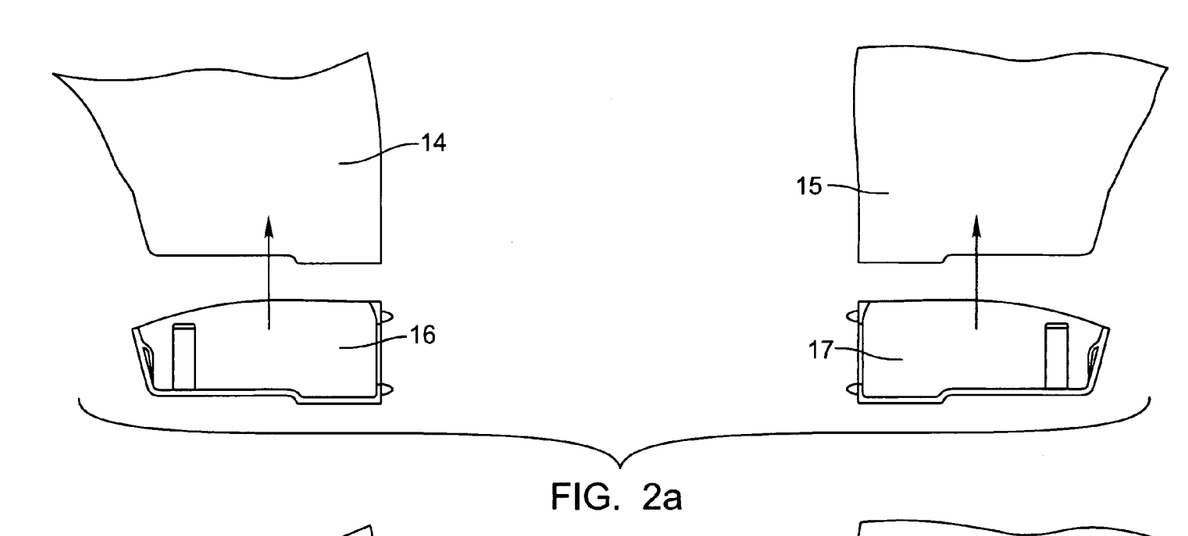
FIGS. 2a–d illustrate the steps required to produce an airbag system according to FIG. 1.
Figure 2B:
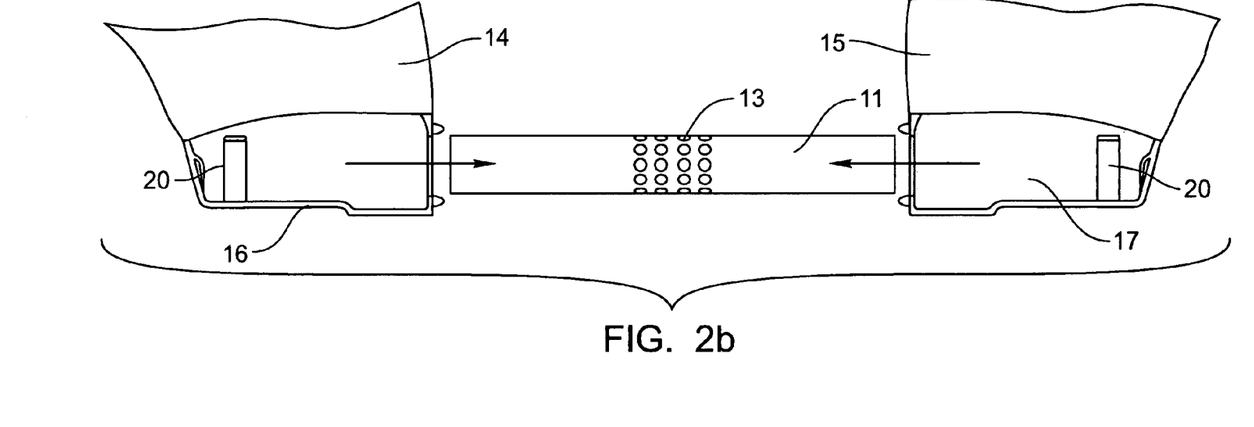

As illustrated in FIG. 2a, such an airbag system can be installed by first inserting the two deflectors 16, 17 into the associated openings of the respective airbag 14, 15. The deflectors 16, 17 each have a mount 20 in which the gas generator is inserted. In a next step shown in FIG. 2b, the gas generator 11 is inserted between the two deflectors 16, 17, which are connected to the airbags 14, 15 and are spaced apart from one another. The two deflectors 16, 17 are then pushed together until they are interconnected, for example by a plug-in connection, and thereby form a unit.

Figure 2C:
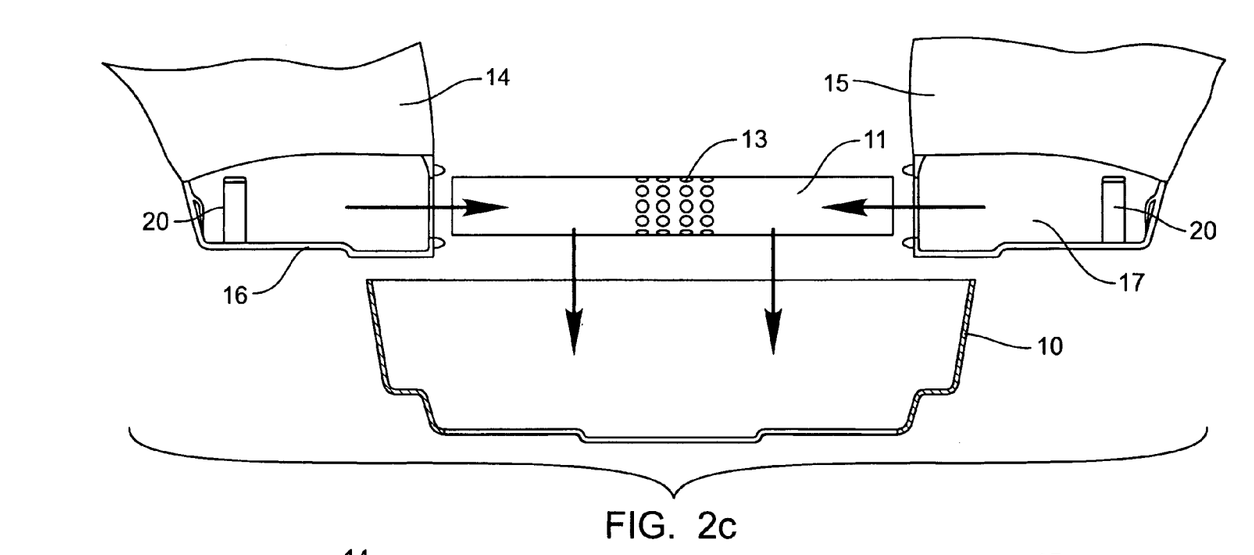
Figure 2D:
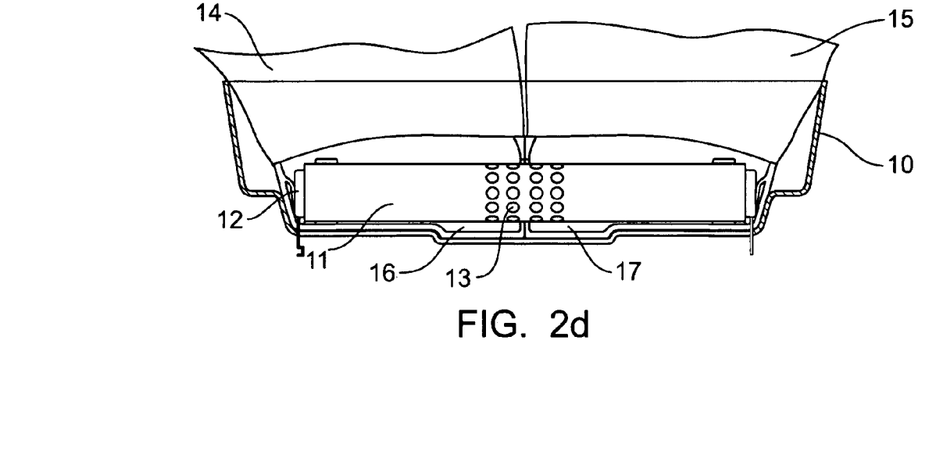
Figure 3A:
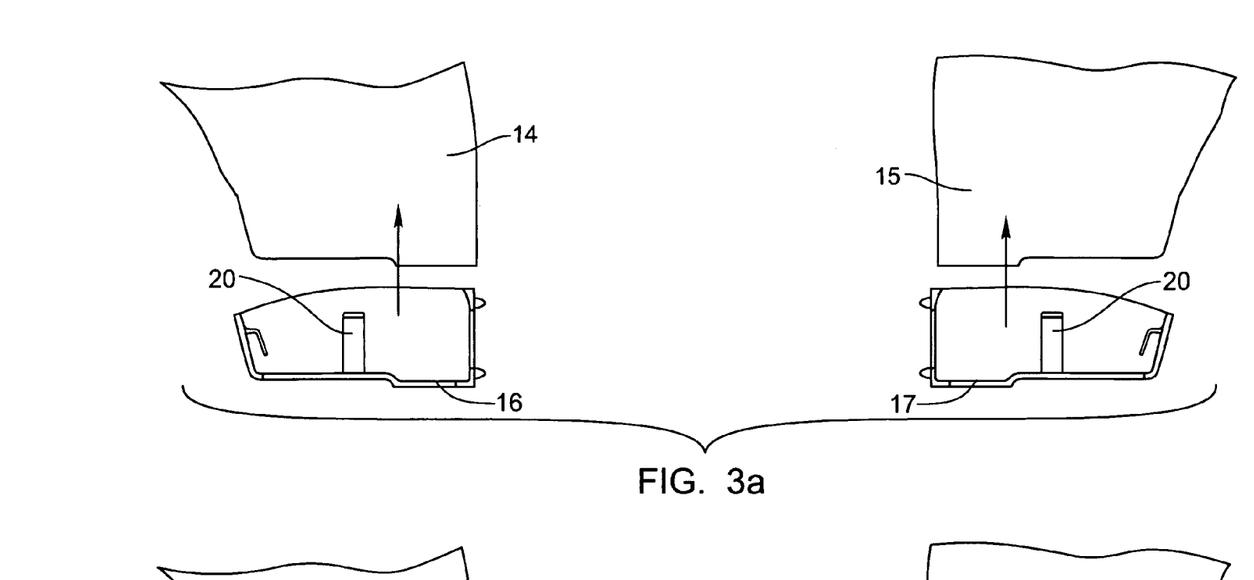
FIGS. 3a–d show the steps according to FIGS. 2a–d required to produce an airbag system with a biaxial gas generator.
Figure 3B:
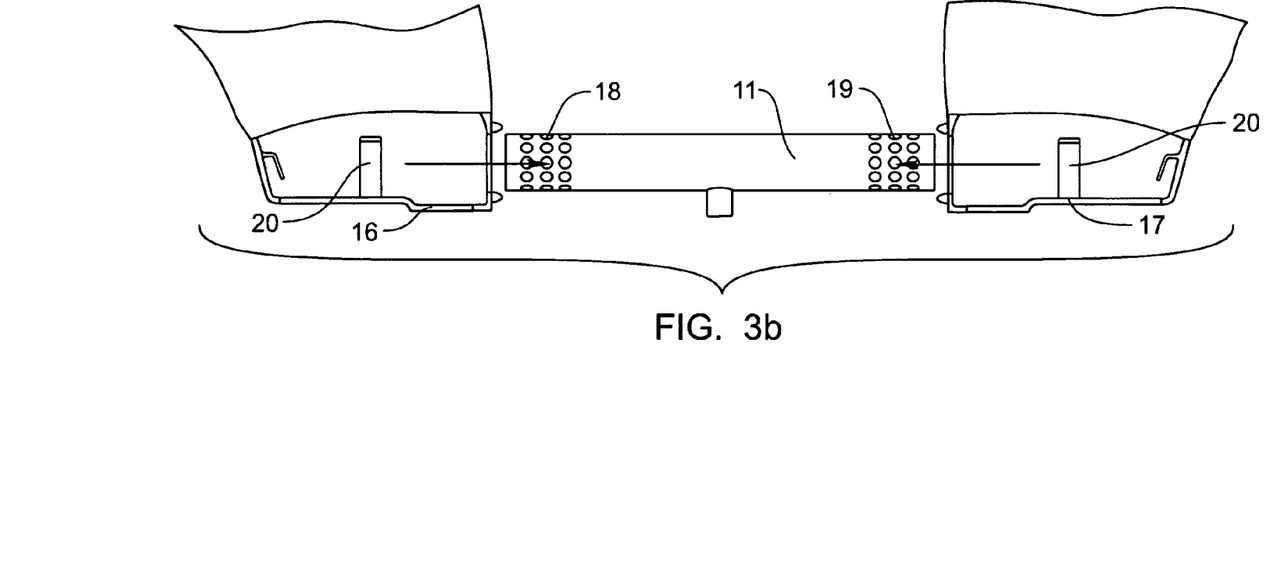
Figure 3C:
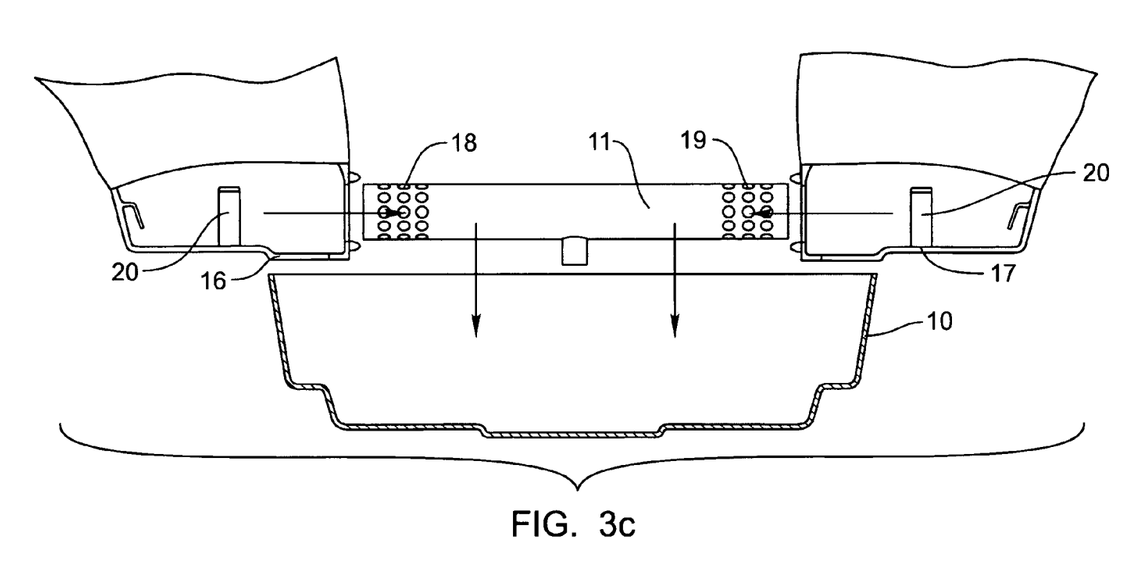
Figure 3D:
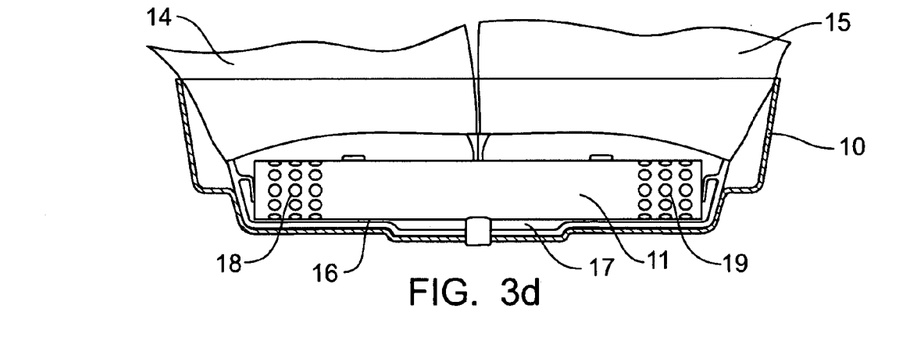
Figure 4A:
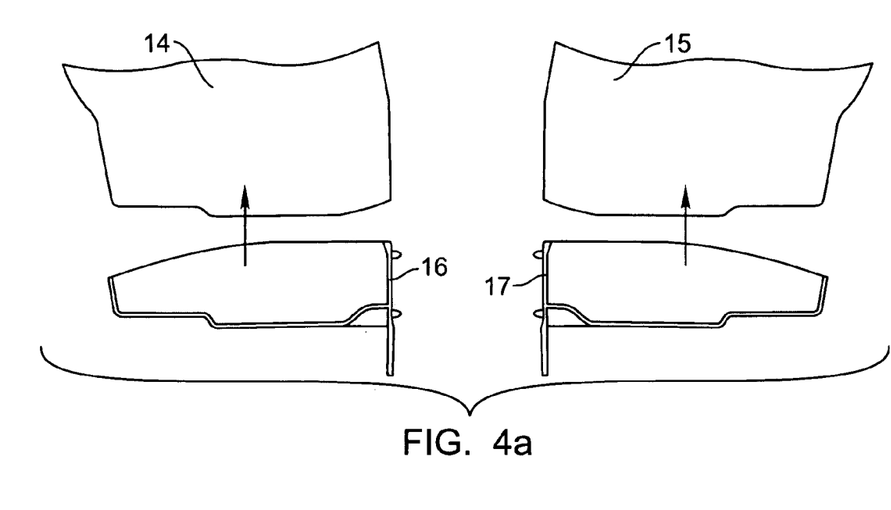
FIGS. 4a–d show the steps according to FIGS. 2a–d required to produce another embodiment of the airbag system.
Figure 4B:
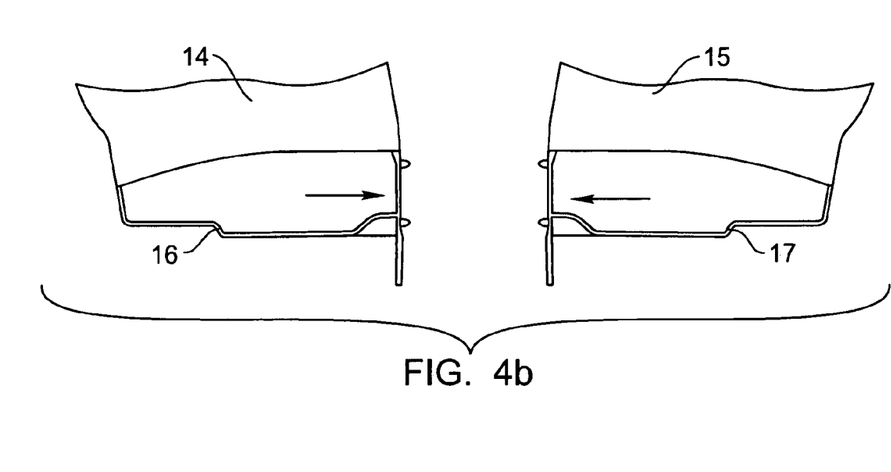
Figure 4C:
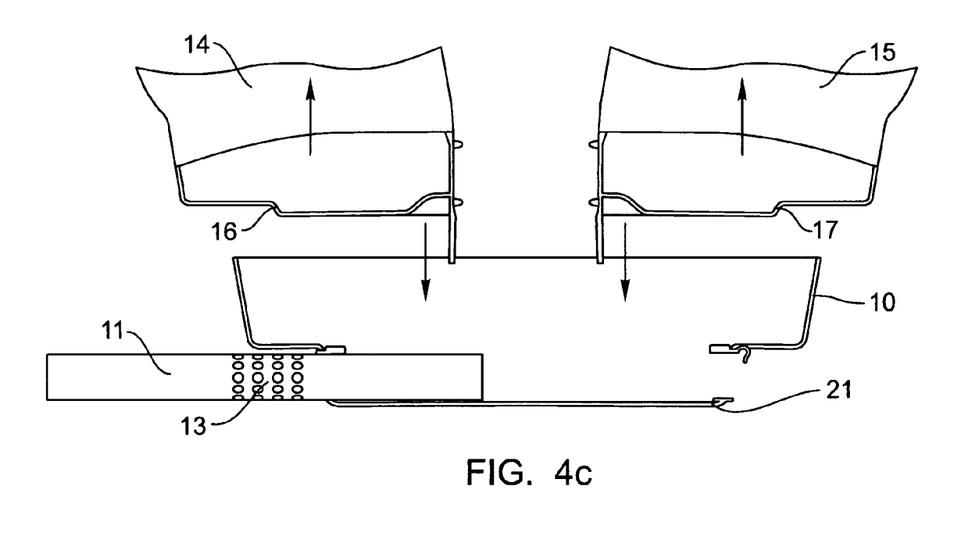
Figure 4D:
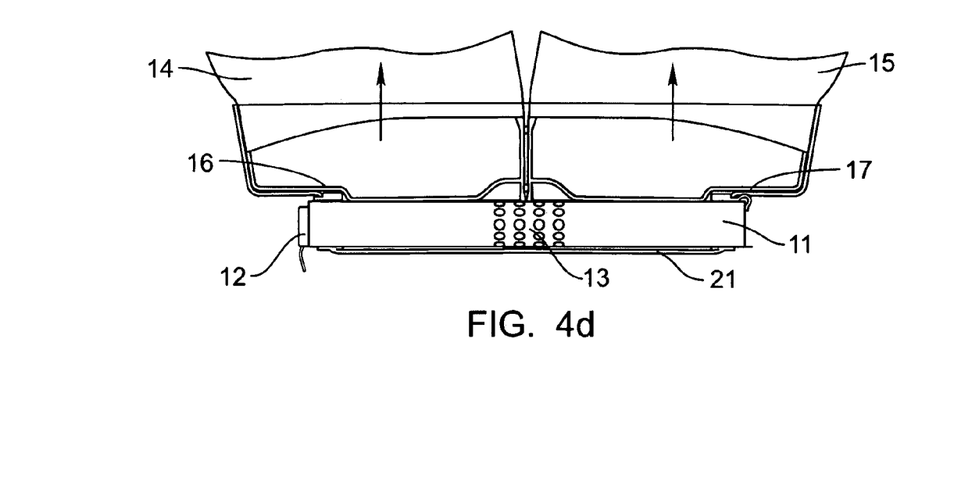

According to FIG. 2c, this unit is then inserted into the common housing 10, the shape of which is adapted accordingly, and is fixed to the housing 10. The completed airbag system is shown in FIG. 2d.

The embodiment depicted in FIGS. 3a–d is distinguished from that described above only in that the gas generator 11 is a biaxial gas generator with inflation areas 18 and 19 arranged along its exterior so that the two airbags 14 and 15 are associated with separate outflow areas. In the embodiment depicted in FIGS. 4a–d the gas generator 11 is arranged below the deflectors 16, 17 in a corresponding housing extension 21 so that the deflectors 16, 17, together with the connected airbags 14, 15 are inserted into the housing 10 as a unit and are thereby fixed in a mount located above the gas generator.

The characteristics of the subject of these documents disclosed in the preceding description, the patent claims, the abstract, and the drawing can be utilized individually or in any combination for the creation of the invention in its various embodiments. The present invention may be embodied in other specific forms without departing from its structures, methods, or other characteristics as described herein and claimed hereinafter. The described embodiments are to be considered only as illustrative, and not restrictive.

What is claimed is:

1. An airbag system for jointly supporting at least two vehicle occupants inside a motor vehicle in case of an accident comprising:
   at least two separate airbags;
   a common gas generator connected to the at least two airbags having outflow areas associated with the at least two airbags such that the airbags are inflatable with a gas supplied by the gas generator;
   at least two separate deflectors, wherein each airbag is sealed against the other airbag by means of at least one deflector inserted therein; and
   a common housing arranged in the dashboard of the motor vehicle, wherein the at least two airbags are folded into the common housing and wherein the at least two airbags are deployed from the common housing in the same direction.

2. The airbag system as claimed in claim 1, further comprising an additional airbag folded into the common housing and connected to an additional outflow area of the gas generator and sealed by means of an associated additional deflector.

3. The airbag system as claimed in claim 1, characterized in that the gas generator is designed for a symmetrical outflow capacity at the outflow areas provided.

4. The airbag system as claimed in claim 1, characterized in that the outflow areas of the gas generator associated with the at least two airbags have different outflow capacities.

5. The airbag system as claimed in claim 1, characterized in that the gas generator is a biaxial gas generator and has a central combustion system with adjusted gas distribution to its outflow areas.

6. The airbag system as claimed in claim 1, characterized in that the gas generator is a biaxial gas generator and has separate combustion systems assigned respectively to its outflow areas.

7. The airbag system as claimed in claim 1, characterized in that two gas generators are provided in the common housing, each having associated outflow areas, wherein the gas generators operate as a two-stage system, and each airbag is connected to the associated outflow areas of the two gas generators.

8. The airbag system as claimed in claim 1, characterized in that the deflectors arranged in the airbags can be interconnected and jointly mounted as a unit in the common housing, together with the connected airbags.

9. The airbag system as claimed in claim 1, characterized in that the airbags are folded into the common housing with a substantially identical folding pattern.

10. The airbag system as claimed in claim 1, characterized in that the airbags are folded into the common housing with a different folding pattern.

11. The airbag system as claimed in claim 1, characterized in that the airbags are made of the same material.

12. The airbag system as claimed in claim 1, characterized in that the airbags are made of different materials.

13. The airbag system as claimed in claim 1, characterized in that the gas generator is designed for a symmetrical outflow capacity at the outflow areas provided.

14. The airbag system as claimed in claim 1, characterized in that the outflow areas of the gas generator associated with the at least two airbags have different outflow capacities.

15. The airbag system as claimed in claim 14, characterized in that the gas generator is a biaxial gas generator and has a central combustion system with adjusted gas distribution to its outflow areas.

16. The airbag system as claimed in claim 14, characterized in that the gas generator is a biaxial gas generator and has separate combustion systems assigned respectively to its outflow areas.

17. The airbag system as claimed in claim 14, characterized in that two gas generators are provided in the common housing, each having associated outflow areas, wherein the gas generators operate as a two-stage system, and each airbag is connected to the associated outflow areas of the two gas generators.

18. The airbag system as claimed in claim 14, characterized in that the deflectors arranged in the airbags can be interconnected and jointly mounted as a unit in the common housing, together with the connected airbags.

19. The airbag system as claimed in claim 14, characterized in that the deflectors arranged in the airbags can be interconnected and jointly mounted as a unit in the common housing, together with the connected airbags.

* * * * *

UNITED STATES PATENT AND TRADEMARK OFFICE
CERTIFICATE OF CORRECTION

| | | |
|---|---|---|
| PATENT NO. | : 7,093,846 B2 | Page 1 of 1 |
| APPLICATION NO. | : 10/630163 | |
| DATED | : August 22, 2006 | |
| INVENTOR(S) | : Thomas Reiter et al. | |

It is certified that error appears in the above-identified patent and that said Letters Patent is hereby corrected as shown below:

In column 4, line 45, please change "as claimed in claim 14," to --as claimed in claim 1--

Signed and Sealed this

Thirteenth Day of February, 2007

JON W. DUDAS
*Director of the United States Patent and Trademark Office*